Patented June 12, 1923.

1,458,505

UNITED STATES PATENT OFFICE.

WALTER JAMES STEVENSON, OF LONDON, ENGLAND.

PLASTIC COMPOSITION FOR FILMS OR FILAMENTS FOR CINEMATOGRAPHIC AND OTHER INDUSTRIAL PURPOSES.

No Drawing.   Application filed April 2, 1921.   Serial No. 458,048.

(GRANTED UNDER THE PROVISIONS OF THE ACT OF MARCH 3, 1921, 41 STAT. L., 1313.)

*To all whom it may concern:*

Be it known that I, WALTER JAMES STEVENSON, a subject of the King of Great Britain and Ireland, residing at The Royal Automobile Club, Pall Mall, London, S. W., England, have invented certain new and useful Improvements relating to Plastic Composition for Films or Filaments for Cinematographic and Other Industrial Purposes (for which I have filed application in England, August 21, 1918, Patent No. 138,379), of which the following is a specification.

This invention relates to the manufacture of non-inflammable films and filaments for cinematographic and other industrial purposes by adding triacetine and triphenylphosphate to acetyl cellulose.

According to this invention, the non-inflammable film or filament is formed by dissolving acetyl cellulose in a solvent and then adding substantially equal amounts of triacetine and triphenylphosphate, the amounts of each of the two last mentioned substances used being from ten to thirty per cent of the weight of acetyl cellulose. For example, the amounts of the substances may be:

|   | Grammes. |
|---|---|
| Acetyl cellulose | 200 |
| Triacetine | 20 |
| Triphenylphosphate | 20 |

By the aforesaid treatment, films are produced which are non-inflammable, impermeable, durable, flexible and very transparent, and which can be used for lining projectiles. The acetyl cellulose is first thoroughly dried. A solvent is then added, this solvent being for example tetrachloride of ethane or benzyl alcohol, the acetyl cellulose being well mixed therewith, shaken and kneaded either in an ordinary mixing machine or pug mill. It is preferable to use as a solvent tetrachloride of ethane or benzyl alcohol because they do not provoke condensation as in the case of the solvent acetone and also because they are less volatile. The triacetine is added and the mixture is allowed to stand for say one to one and a half hours. The triphenylphosphate is then added. The films are formed by pouring the material on to a glass plate in the usual manner. The film must be thoroughly dried and with this object it is allowed to remain on the glass plate for some time and so as also to permit complete evaporation of the tetrachloride of ethane or other solvent to take place.

The triphenylphosphate may be added before the triacetine.

I claim:

1. The manufacture of non-inflammable films or filaments by dissolving acetyl cellulose in a solvent and then adding substantially equal amounts of triacetine and triphenylphosphate, the said amounts being from ten to thirty per cent of the weight of acetyl cellulose.

2. A non-inflammable film consisting of acetyl cellulose and equal amounts of triacetine and triphenylphosphate in the proportion of from 10 to 30% of the weight of acetyl cellulose.

WALTER JAMES STEVENSON.